United States Patent [19]

Reid

[11] Patent Number: 4,460,471
[45] Date of Patent: * Jul. 17, 1984

[54] FLOW-CONTROL PROCESS FOR AN OXIDATION DITCH

[76] Inventor: John H. Reid, 7 Stansbury Ct., Fredericksburg, Va. 22401

[*] Notice: The portion of the term of this patent subsequent to Jul. 14, 1998 has been disclaimed.

[21] Appl. No.: 355,150

[22] Filed: Mar. 5, 1982

Related U.S. Application Data

[63] Continuation of Ser. No. 848,705, Nov. 4, 1977, abandoned, which is a continuation-in-part of Ser. No. 649,995, Jan. 19, 1976, abandoned.

[51] Int. Cl.³ .............................................. C02F 3/20
[52] U.S. Cl. .................................... 210/629; 210/630; 210/926; 210/194; 261/124
[58] Field of Search ............... 210/620, 621, 629, 626, 210/627, 628, 194, 219, 630, 220, 320, 903, 926; 261/91, 93, 124

[56] References Cited

U.S. PATENT DOCUMENTS

| | | | |
|---|---|---|---|
| 1,247,542 | 11/1917 | Jones | 210/926 |
| 2,263,534 | 11/1941 | Aldridge | 261/93 |
| 3,206,176 | 9/1965 | Peterson | 210/629 |
| 3,579,439 | 5/1971 | Meiring | 210/903 |
| 3,642,257 | 2/1972 | Tanaka et al. | 261/93 |
| 3,671,022 | 6/1972 | Laird et al. | 261/93 |
| 3,819,512 | 6/1974 | Praznovsky et al. | 210/629 |
| 3,865,908 | 2/1975 | Hirshon | 261/124 |
| 3,900,394 | 8/1975 | Rongved | 210/903 |
| 3,994,802 | 11/1976 | Casey et al. | 210/903 |
| 4,278,547 | 7/1981 | Reid | 210/926 |

FOREIGN PATENT DOCUMENTS

166160  8/1974  Hungary ............................ 210/926

*Primary Examiner*—Benoit Castel
*Attorney, Agent, or Firm*—Marion P. Lelong; William H. Murray

[57] ABSTRACT

This flow-control apparatus for an oxidation ditch comprises a barrier which divides a channel of an oxidation ditch into an intake channel and a discharge channel, at least one submerged turbine which pumps mixed liquor from the intake channel, and at least one discharge duct which connects each turbine to the discharge channel and passes beneath the barrier. Compressed air is supplied to each turbine and/or to each discharge duct. Activated sludge is fed to the anoxic portion of the ditch and/or to each turbine which provides complete mix and propels the mixed liquor in plug-type flow through the channels of the oxidation ditch. By selectively and independently controlling turbine speed and amount and/or feed location of compressed air, the timed aerobic/anoxic ratio for the ditch can be controlled in accordance with independent parameters, such as seasonal temperatures.

16 Claims, 4 Drawing Figures

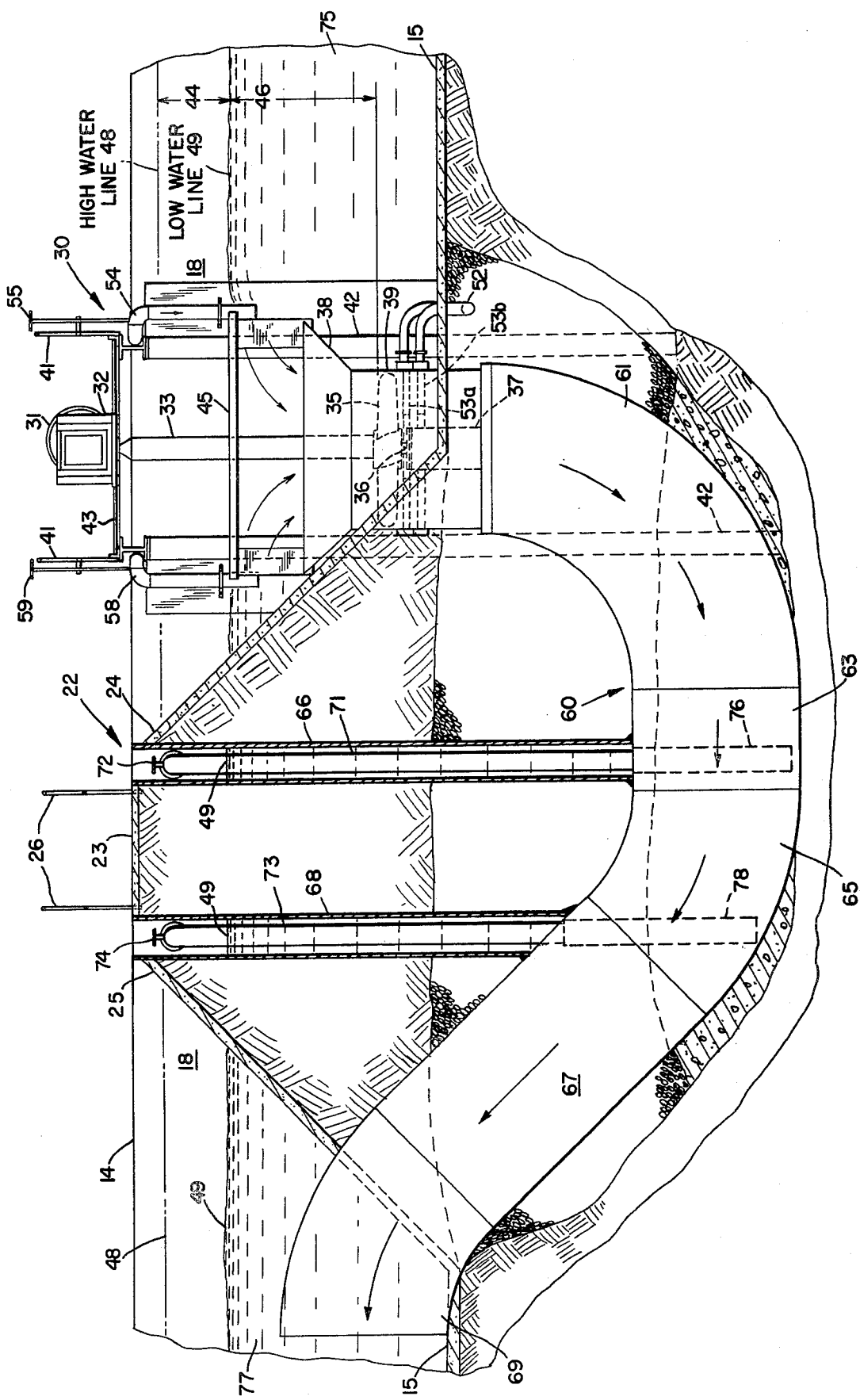

FLOW-CONTROL PROCESS FOR AN OXIDATION DITCH

CROSS-REFERENCE TO RELATED APPLICATIONS

This is a continuation of application Ser. No. 848,705 filed Nov. 4, 1977, which application is a continuation-in-part of Ser. No. 649,995, filed Jan. 19, 1976, entitled "FLOW CONTROL APPARATUS AND METHOD FOR AEROBIC SEWAGE TREATMENT" of John Hager Reid, which are both now abandoned.

BACKGROUND OF THE INVENTION

1. Field of the Invention

This invention relates to gas-liquid contacting devices and the use of such devices in liquid treatment systems. The invention additionally relates to oxygen-absorption processes requiring repeated and prolonged air-liquid contact in sequential stages. The invention especially relates to methods and apparatus for aeration pumping of wastewater such as sewage within aerobic purification systems of the looped channel type, such as oxidation ditches.

2. Review of the Prior Art

Many liquid treatment processes, commonly termed aerobic processes, supply bacteria and other bio-organisms with dissolved oxygen for treating aqueous wastes such as municipal sewage, cannery wastes, dairy wastes, meat-processing wastes, and the like.

Such aerobic processes are commonly accelerated by concentrating and activating the bio-organisms, termed biomass or activated sludge, and returning this sludge to be mixed with incoming wastewater which supplies food for the organisms. Activated-sludge processes for aerobic treatment of wastewaters have followed two main lines of development: vertical-flow aeration basins and circuit-flow oxidation ditches.

Vertical-flow aeration basins are typically aerated on a large scale with one or more impeller-type aerators which are vertically mounted and disposed at the surface of the liquid, as discussed in *Water & Wastes Engineering*, September 1975, pages 76–79, using an aerator such as is described in U.S. Pat. No. 3,479,017 and producing a uniform dissolved-oxygen (D.O.) content of 2.0 mg/liter. Such impeller aerators are frequently mounted within and at the upper open end of a draft tube extending partially or entirely to the bottom of the basin so that the aerator can more efficiently pump liquid from the bottom of the basin, having a depth up to 40 feet, and disperse it over the surface of the basin, thereby improving vertical circulation over a wide area. When fitted with a gear reducer to spin a nine-foot diameter impeller at low speeds, oxygen transfer efficiencies of 3.5 pounds $O_2$/hp/hour have been approached.

In an early oxidation-ditch process, Dutch Patent No. 87,500 discloses horizontally mounted rotors having brush surfaces for adding oxygen to sewage and causing the sewage to flow for a period of time in a closed-loop circuit within an ovally laid-out ditch, the liquid then being clarified by settling and excess sludge being removed. In subsequent developments directed to adding oxygen to sewage and inducing circuit-flow circulation in oxidation ditches, U.S. Pat. No. 3,336,016 discloses an S-shaped duct, U.S. Pat. No. 3,510,110 the combination of a longitudinal partition and a vertically disposed surface aerator which is adjacent thereto, and U.S. Pat. No. 3,846,292 a plurality of subsurface ejector aerators.

Finally, U.S. Pat. No. 3,900,394 discloses a sewage purification process, to be carried out in a circuit-flow oxidation ditch having an impeller-type aerator at one or both ends, which comprises sequential aeration of incoming sewage, aerobic decomposition and depletion of its oxygen content, introduction of additional sewage to the oxygen-starved bacteria, and, simultaneously, aerobic decomposition and denitrification of the additional sewage as the bacteria break down its nitrates.

A circuit-flow oxidation ditch is a complete mix system operating in plug-type flow. It can be designed to operate with recycled sludge on a food-to-microorganism ratio (F/M) varying over a possible range of 0.01 to 5.0, depending upon space, cost, and process design requirements. If operating at a low F/M ratio of 0.01–0.2, it is an extended aeration system, producing small quantities of sludge. If operating at a medium F/M ratio of 0.2–0.5, it is a conventional system. If operating at a high F/M ratio of 0.5–2.5, it is a high-rate activated sludge system, producing large quantities of sludge. Moreover, it can even be operated as an activated lagoon with no recycled sludge, having F/M ratios above 2.5. An oxidation ditch may also shift through a wide F/M range, representing all three of these systems, as it begins operation as a high-rate activated sludge system, with no built-up sludge, and gradually builds up its recycled sludge to a mixed liquor suspended solids (MLSS) content of 3,000 mg/l where extended aeration can generally be considered to begin.

There are now three main types of aeration apparatuses in use within circuit-flow oxidation ditches of varied depth and variety of layouts, such as an oval-shaped racetrack and a plurality of looped or endless channels. These are:

(1) horizontally shafted surface aerators,
(2) vertically shafted surface aerators, and
(3) eddy-jet type subsurface aerators.

Horizontally shafted surface aerators are of two general types:

(1) brush, cage, or rotor aerators, such as those manufactured by Lakeside Equipment Corporation, Bartlett, Ill., and Passavant Corporation, Birmingham, Ala., which have a maximum power input of about 50–60 horsepower, and
(2) aeration discs, such as those manufactured by Envirex, Incorporated, Waukesha, Wisc.

Each type transfers 2–3.25 pounds of oxygen per shaft horsepower per hour from air to the mixed liquor.

Slow-speed surface aerators are used in looped channel designs known as Carrousel, developed by Dwars, Heederik Verhey, of Amersfoort, the Netherlands, as an improved form of the basic oxidation ditch. Each aerator is mounted vertically in the rounded end of a deep channel having a central partition that is positioned close to the aerator to create within the channel a uniform turbulent flow that is both longitudinal and spiral in nature. Such a surface aerator transfers 3–4 pounds of $O_2$/hp/hr from air to mixed liquor.

An eddy-jet system is known as deep channel jet aeration, sold by Penberthy Division of Houdaille Industries, in which air jet headers are mounted near the floor of a 20-foot deep channel to provide propulsion and high-efficiency aeration at an oxygen transfer efficiency of 3–4 pounds $O_2$/hp/hr.

Greater transfer efficiencies are needed in order to conserve energy and minimize the cost and number of aeration devices which are needed in an oxidation ditch.

When oxygenating water with air, the necessary driving force increases non-linearly as the dissolved-oxygen content of the water increases. Frequency of liquid-gas contact is consequently quite important from an efficiency viewpoint even though mixing of liquid parcels having various contents of dissolved oxygen soon produces a uniform average oxygen content. More specifically, if a portion of the liquid, initially having zero dissolved oxygen, contacts a gas such as air several times, it at first absorbs oxygen very readily but increasingly slowly thereafter. Vertical circulation causes some aerated water to be directly back-mixed into the intake of the aerator. Thus, energy is wasted by attempting to re-aerate water that has already been aerated. A need consequently exists for a flow control method and means for minimizing vertical circulation and turbulent mixing and for bringing liquid and gas into singly occurring contact.

These prior-art systems using surface aerators are generally plagued with aerosol spray and misting, freezing problems in cold weather, dependence of mixing and power consumption upon oxygen demand, excessive noise, dependence of power consumption upon liquid-level variations, and the need for floating aerators to compensate for variations in the liquid level. The eddy-jet system requires excessively high blower pressure to introduce air at the bottom of a deep channel and requires the operation and maintenance of a plurality of circulation pumps to force or inject mixed liquor through the submerged jets.

These problems could be minimized or obviated by using a submerged turbine to provide subsurface aeration, but there is no means available for mounting a submerged turbine within an oxidation ditch so that plug-type flow can be generated, channel velocity can be accurately controlled, back mixing can be avoided, and complete mix can be attained.

In order to facilitate mass transfer of oxygen from air bubbles into the mixed liquor and thence into the microorganisms, it is also desirable to avoid the prior-art environment of relative quiesence and to provide instead a means for shearing all of the bacterial floc within an oxidation ditch into smaller particles, such as by forcing all of the mixed liquor past a shear-type pump means or a bubble-splitting and mixing means, at least once per circuit-flow cycle. However, no means exists in the prior art for requiring all of the mixed liquor to pass through either such means.

In addition, bacterial activity can be enhanced by increasing the dissolved-oxygen content of the mixed liquor at least once per circuit-flow cycle, such as by generating pressures upon the air bubble-mixed liquor mixture that are greater than the hydraulic pressure within the channel of the oxidation ditch. Again, no such practical means exists for an oxidation ditch.

SUMMARY OF THE INVENTION

It is therefore an object of this invention to provide a means for mounting a submerged turbine within an oxidation ditch.

It is also an object to provide a means for preventing vertical circulation and back mixing of aerated liquid from the discharge of a submerged turbine within an oxidation ditch to the intake thereof.

It is further an object to provide a means for completely mixing return sludge, wastewater feed, and air at the intake of a submerged turbine within an oxidation ditch.

It is still further an object to provide a means for generating plug-type flow within an oxidation ditch, from the discharge of a submerged turbine mounted therewithin to the intake thereof, without backmixing of aerated liquid.

It is likewise an object to provide a means for accurately controlling flow velocity within the channel of an oxidation ditch, from the discharge of a submerged turbine mounted within the ditch to the intake thereof, without backmixing of aerated liquid.

It is another object to provide a means for generating pressures upon liquids and air being pumped by said submerged turbine that are greater than the hydraulic pressure at the bottom of the channel in the oxidation ditch.

It is still another object to provide a means for maintaining a generated pressure upon a liquid-air mixture, for a selected distance and/or during a selected time interval, that is greater than the hydraulic pressure at the bottom of the channel in the oxidation ditch.

It is an additional object to provide a means for maintaining, throughout the entire aerobic portion of the oxidation ditch, a generated pressure upon a liquid-air mixture that is greater than the hydraulic pressure at the bottom of the channel in the oxidation ditch.

It is a still additional object to provide a means for continually forcing, at least once per cycle, all of the mixed liquor within an oxidation ditch past a shear means for shearing bacterial floc into smaller particles.

It is moreover an object to provide variable velocity control, so that the ditch velocity can be controlled over a wide range, and independently variable aeration control, so that the dissolved-oxygen content of discharged liquor can also be varied over a wide range, independently of the flow rate in the oxidation ditch.

It is furthermore an object to provide a means for controlling the lengths of the aerobic and anoxic zones within the channel of an oxidation ditch in order to adjust and control the relative populations of heterotrophic aerobic and heterotrophic facultative (denitrifying) bacteria and autotrophic (nitrifying) bacteria in order that the operation of the ditch will respond to seasonal temperature changes.

In accordance with these objectives and the principles of this invention, apparatuses and methods are herein described that provide a submerged turbine, a mounting means for the turbine, a feed means for compressed air, a feed means for return sludge, a feed means for raw wastewater, a barrier means for: (a) forcing all mixed liquor through the intake of the submerged turbine on the upstream side of the barrier means, (b) preventing back mixing and vertical circulation of aerated liquid to the turbine intake, and (c) accumulating all aerated liquid on the downstream side of the barrier means, and a discharge duct from the turbine to the downstream side of the barrier means which passes beneath the barrier means, preferably at a greater depth than the floor of the oxidation ditch channel. The discharge duct comprises a curved discharge section connected to the turbine, a first straight section connected to the curved discharge section, an updraft section connected to the straight section, a second straight section connected to the updraft section, and a terminal duct connected to the second straight section and disposed on the downstream side of the barrier means.

The discharge duct may contain throughout any selected portion of its length a bubble-splitting and mixing means, such as the structures described in U.S. Pat. Nos. 3,782,694; 3,635,444; 3,643,927; 3,664,638; 3,751,009; 3,733,057; and 3,794,300, or an interfacial surface generator, such as the structures described in U.S. Pat. Nos. 3,358,749; 3,394,924; and 3,406,947. The discharge duct may also be extended in the direction of flow for a sufficient distance that substantially all of the aerobic activity of the ditch occurs within the discharge duct and under a selected hydraulic pressure that is greater than the pressure corresponding to the depth of the channel.

The term, oxidation ditch, is currently used for relatively shallow oval-shaped basins in which mixed liquor is continuously circulated by horizontally mounted surface aerators, such as cage rotors and disc rotors, and other terms, such as looped channel and endless channel, are currently used for deep basins in which the mixed liquor moves back and forth through a plurality of side-by-side channel portions which have adjoining walls and semi-cylindrical ends providing connections between adjacent channel portions. However, the term, oxidation ditch, is employed herein as a general term encompassing both shallow and deep basins, whether circular, oval, or looped in any endless configuration.

In such a closed-circuit oxidation ditch, this invention comprises at least one flow-control apparatus which provides repetitive aerobic treatment to all of the mixed liquor within the channel of the oxidation ditch. The flow-control apparatus comprises a barrier which is sealably attached to the sides of the oxidation ditch and divides the mixed liquor into upstream liquor within an intake channel and downstream liquor within a discharge channel. The flow-control apparatus also comprises at least one submerged turbine, which is disposed to receive the upstream liquor and pump it downwardly. Each submerged turbine is attached to the bottom and/or sides of the oxidation ditch and/or the barrier and comprises a motor, a speed-reduction means, a turbine shaft, turbine blades, at least one air sparge ring, and a downdraft tube surrounding the blades.

A discharge duct is connected to the downdraft tube, leads downwardly to any desired depth, curves in a downstream direction, and leads upwardly to a discharge point within the discharge channel. Preferably, the discharge duct reaches a greater depth than that of either the intake channel or the discharge channel.

The flow-control apparatus of this invention provides separate control of mixed-liquor flow velocity and of mixed-liquor aeration. This operating characteristic is partly possible because the pumping capacity of the turbine is decreased only to a slight extent by varying the amount of air that is introduced to the sparge ring and is increased to a significant extent by introduction of compressed air to any of the sections of the discharge duct. By selectively shifting the proportions of air introduced to the sparge ring and to the discharge duct, the flow rate can be varied by at least 50 percent, and by varying: (a) operation of the turbines singly or in parallel, (b) the speeds of the turbines, (c) the total amount of air, and (d) the proportion of air between the sparge ring and the discharge duct, it is readily possible to vary the flow rate over a range of from 0.5 ft/sec to at least 3.0 ft/sec while maintaining a desired dissolved-oxygen (D.O.) output or to vary the D.O. output while maintaining a desired flow rate or to vary both properties in any desired combination, while operating all turbines at a constant speed.

One consequence of this capability is that the lengths of the aerobic and anoxic zones within the oxidation ditch can be varied as desired, particularly in accordance with seasonal temperature changes. If the flow rate is maintained constant and the D.O. level is decreased, for example, the aerobic zone is shorter and the anoxic zone is longer so that the mixed liquor is subject to aerobic and anoxic conditions for correspondingly timed aerobic/anoxic ratios. If the flow rate is increased, for example, while the D.O. level remains constant, the aerobic zone is maintained for the same time interval but throughout a greater distance so that a smaller remaining distance is in the anoxic state. Thus, the timed aerobic/anoxic ratio is increased.

BRIEF DESCRIPTION OF THE DRAWINGS

The accompanying drawings enable the invention to be better understood.

FIG. 2 is a sectional elevation, taken approximately in mid-channel and looking in the direction of the arrows 2—2 in FIG. 1.

DETAILED DESCRIPTION OF THE PREFERRED EMBODIMENT

Figure 1:
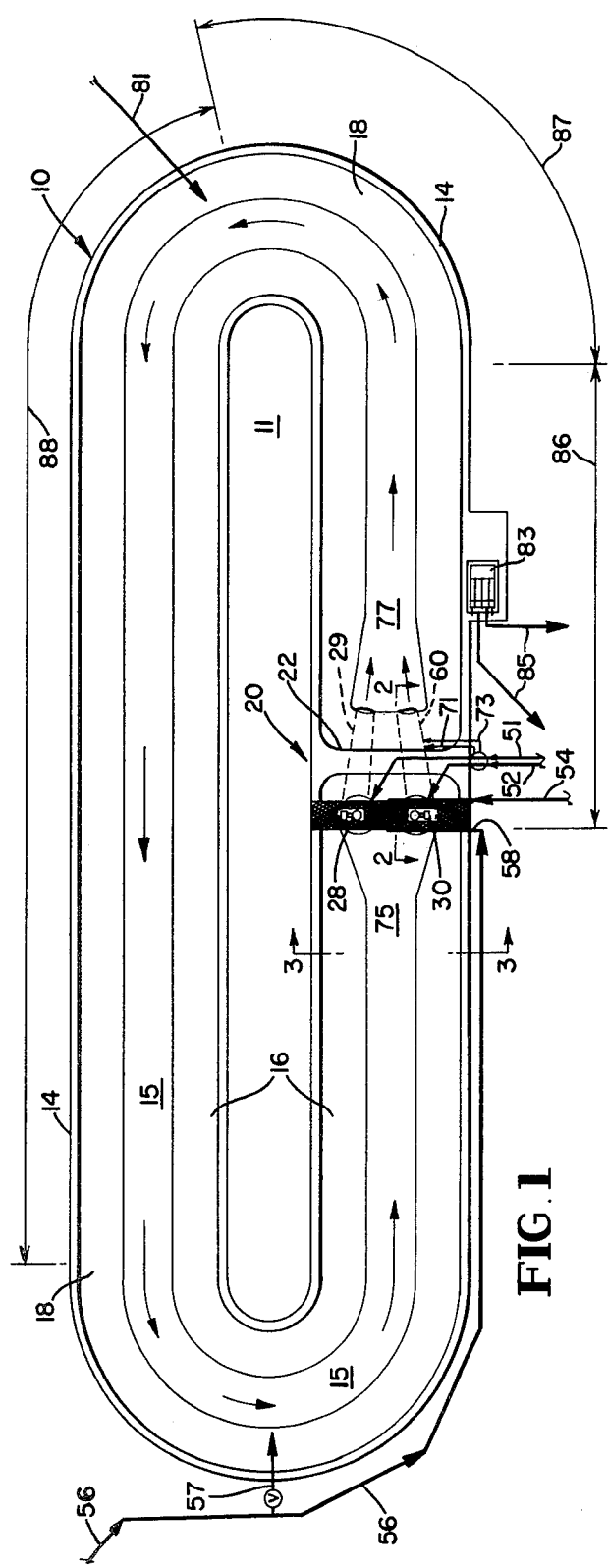
FIG. 1 is a plan view of an oval-shaped oxidation ditch having an island and a double-turbine flow-control apparatus of this invention, disposed athwart one straight channel.
Figure 3:
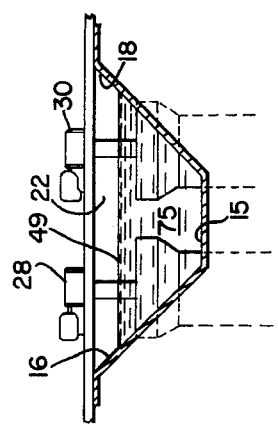
FIG. 3 is a cross-sectional elevation of the oxidation ditch shown in FIG. 1, looking in the direction of the arrows 3—3 in FIG. 1, toward the turbines and the barrier.

The flow-control apparatus 20 of this invention, as shown in FIGS. 1–3, is installed athwart a channel of an oxidation ditch 10 having an island 11, inner edge 12, and outer edge 14. Such a channel typically has a floor or bottom 15, sloping inner side 16, and sloping outer side 18.

The flow-control apparatus 20 comprises a barrier 22, a pair of turbines 28 and 30, which are preferably low-speed, vertically mounted, electrically driven turbines, and respective discharge ducts 29 and 60. The barrier 22 comprises a top 23, an upstream side 24, a downstream side 25, and a pair of handrails 26. Barrier 22 is suitably an earthern berm which is covered on its exposed surfaces with a layer of gunnite.

Turbine 30, as clearly seen in FIG. 2, comprises a motor 31, a speed reducer 32 which is connected thereto, a vertically disposed shaft 33, propeller blades 35 at the bottom end of shaft 33, a coaxially disposed slap ring 36, a stabilizer cylinder 37 into which the slap ring 36 loosely fits, an intake funnel 38 which is disposed above the blades 35, and a downdraft tube 39 which surrounds the blades 35, slap ring 36, and stabilizer cylinder 37.

The turbines 28 and 30 are connected by a walkway 43 and a pair of handrails 41. Turbine 30 is mounted on columns 42 and is equipped with vertically disposed diffusers 47 and a horizontally disposed baffle stabilizer ring 45. An air sparge ring 53, with air openings facing the turbine blades 35, is mounted beneath the turbine blades and is connected to an air delivery line 52. Air delivery line 51 is connected to turbine 28.

As shown in FIG. 1, a raw feed (wastewater) line 56 is connected to an anoxic delivery line 57 and to turbine delivery line 58 which supplies both turbines 28, 30. As seen in FIG. 2, wastewater line 58 is controlled by a valve 59.

Return sludge line 54 likewise supplies both turbines 28,30. As seen in FIG. 2, delivery line 54 to turbine 30 is controlled by valve 55.

Barrier 22 is also sealably attached to sides 16 and 18 and floor 15 of the channel in which it is disposed and which it divides into intake channel 75 and discharge channel 77. As seen in FIG. 2, the mixed liquor in this channel may vary over range 44 in height, from high liquor level 48 to low liquor level 49, so there is always at least a minimum submergence depth 46 for intake funnel 38, a depth that is necessary to prevent cavitation.

Discharge duct 60 for turbine 30 is connected to downdraft tube 39, curves downwardly and forwardly beneath barrier 22 and curves upwardly again to empty into discharge channel 77 where it converges slightly with discharge duct 29. Discharge duct 60 comprises curved discharge section 61 which is connected to downdraft tube 39, first straight section 63 which is connected to section 61 and is horizontally disposed, curved updraft section 65 which is connected to straight section 63, second straight section 67 which is connected to section 65, and terminal duct 69 which is connected to section 67 and is curved downwardly so that discharge of aerated mixed liquor and air is essentially parallel to the floor 15 of the discharge channel 77 which is consequently in a constantly turbulent state.

Discharge duct 60, which is usually exactly like discharge duct 29, may readily be lengthened to any desired extent by inserting a plurality of straight sections 63 and/or by decreasing the angle of curvature of sections 65,69 and inserting a plurality of straight sections 67. Moreover, the efficiency of oxygen-to-liquor transfer may be enhanced, particularly as the bacteria absorb the dissolved oxygen, by installing a plurality of bubble-splitting devices in the straight sections 63, 67 so that fresh interfacial surfaces are being continuously and rapidly generated, the air is prevented from coalescing into large bubbles and is instead split into small bubbles, and the liquid films surrounding individual bacteria and bacterial flocs are thinned, whereby oxygen transfer from the liquor into the bacteria is enhanced. Additional compressed air may be delivered to the discharge ducts 29 and 60 as illustrated for duct 60 in FIG. 2 wherein auxiliary air delivery line 71, controlled by valve 72, delivers air to sparge tube 76 in first straight section 63 and auxiliary air delivery line 73, controlled by valve 74, delivers air to sparge tube 78 in second straight section 67. By selectively adjusting the valves (not shown in the drawings) for lines 51 and 52 and the valves 72 and 74, the flow rate through the discharge ducts 29 and 60 and the aeration of the mixed liquor may be selectively controlled, thereby changing the length of aerobic zone 88 and consequently the timed aerobic/anoxic ratio. This procedure is useful in response to changes in temperature, pH, BOD, and nitrogen load.

Figure 4:
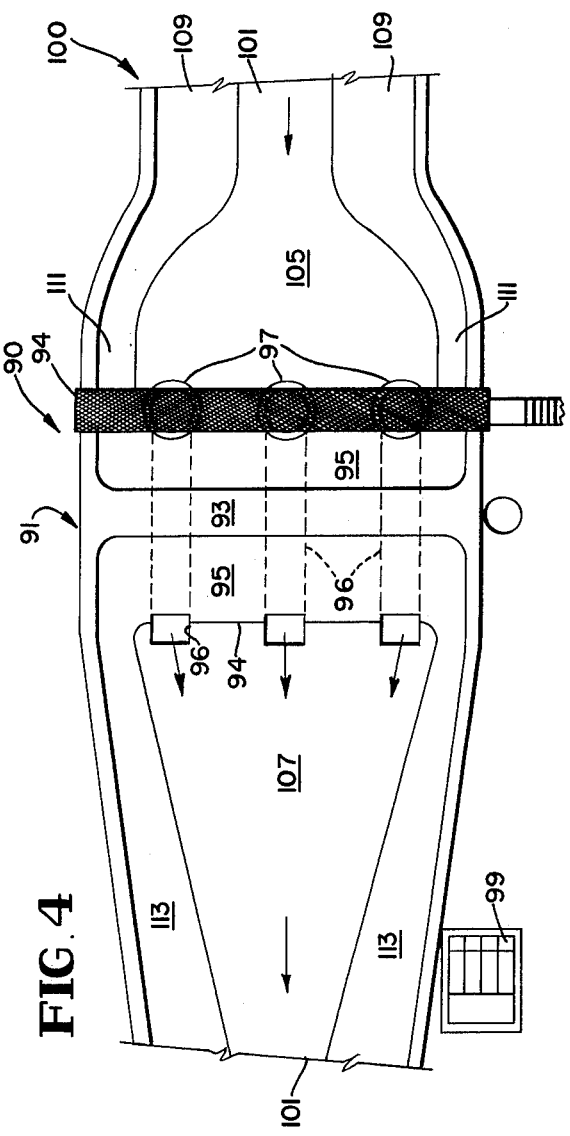
FIG. 4 is a plan view of a portion of an oxidation ditch, similar to the ditch of FIG. 1, having a triple-turbine flow-control apparatus which is disposed athwart a straight channel.

The flow-control apparatus of this invention may be of any desired size and may have any number of turbines in side-by-side relationship, as illustrated in FIG. 4 for a triple-turbine installation. In a straight channel, having sides 109 and floor 101, of oxidation ditch 100, the sides 109 become farther apart and steeper to define the much broader floor of an intake channel 105 which is separated from a discharge channel 107 by flow-control apparatus 90, comprising barrier 91, turbines 97, and discharge ducts 96. Barrier 91 comprises top 93, sides 95, and downstream bottom edge 94. Discharge channel 107 has sides 113 which gradually converge and become less steeply sloped to define a channel floor 101 of normal channel width. Flow dividing unit 99 is disposed outside of oxidtaton ditch 100, adjacent to one side 113.

The submerged turbine which is preferred for use in the flow-control apparatus of this invention is an axial-flow Serial DAT aerator which is manufactured by Mixing Equipment Company, Inc., Rochester, N.Y., equipped with a down-flow, high-efficiency impeller and a sparge ring which is mounted immediately below the impeller, both being surrounded by a vertically disposed and relatively short draft tube. Such a submerged turbine is preferably s mounted within the intake channel at a selected distance below its surface at low water level but may satisfactorily be mounted within the barrier itself, in the island, or in the outer side area, provided that the intake of the turbine is always in flow communication with the intake channel and exposed to sufficient intake head.

A conventional up-flow type of submerged turbine, having its impeller at the end of a terminal duct 69, is also suitable, but this type is preferably mounted in the discharge channel with its intake connected to the terminus of the discharge duct, so that it pulls (rather than pushes) the mixed liquor through the discharge duct from the intake channel to the discharge channel. A sparge means may be located in the downdraft tube (within the intake channel) and/or at another place in the discharge duct, such as in the first straight section and/or immediately below the impeller.

Another pulling type of aerator is a surface aerator which can be located on the top of an updraft tube which is connected to the terminus of the discharge duct. The surface aerator is preferably floatingly supported within the discharge channel. A primary sparge means may also be located within the discharge duct to supply primary aeration.

Any of these devices is a satisfactory pump means for moving the mixed liquor through the discharge ducts 29, 60, 96 along the flow path which each interconnected pump means and discharge duct provides, in combination, between the intake channel 75, 105 and the discharge channel 77,107. Moreover, a down-flow submerged turbine, at the inlet end of the discharge duct, may be combined with either an up-flow submerged turbine or a surface aerator at the outlet end thereof, and a sparge means can additionally be mounted within the discharge duct, so that if air is introduced within either or both turbines, there will be as many as three or even four points of aeration. The advantage of such combinations is that the speed of reaction of the micro-organisms under pressure is utilized, whereby the aerobic portion of the ditch may be greatly shortened.

The aeration means for introducing air to the mixed liquor being pumped from the intake channel to the discharge channel comprises a source of compressed air, a sparge means for producing air bubbles, and a delivery means for moving the compressed air from the source thereof, such as a blower or air compressor, to the sparge means.

The sparge means shown beneath the impeller or turbine blades in FIG. 2 consists of a primary sparge ring 53a and a secondary sparge ring 53b, both being fed by delivery lines 52 with separate valves (not shown in the drawings) for each sparge ring 53a, 53b. Each ring has five radially aligned sparging fingers which are angularly displaced (i.e., offset) so that primary and secondary fingers are not in vertical alignment. Under low to moderate BOD loads, the sparge means 53a, 53b is operated by using the upper or primary ring 53a only. Under heavy BOD loads, both rings 53a, 53b are preferably utilized.

When supplementary air or industrial oxygen is desired, as when BOD loads are very heavy, or when it is desirable to substitute discharge duct aeration for turbine aeration because of flow rate considerations, sparge tubes 76, 78 in first straight section 63 and in curved updraft section 65, respectively, are utilized by adjusting valves 72, 74 which selectively admit compressed air (not shown in the drawings) into auxiliary air delivery lines 71, 73 and thence into sparge tubes 76, 78. The compressed air, liberated as bubbles, is swept along through the discharge ducts 29, 60 to form a mixture of relatively low density so that the velocity of upwardly translational movement through sections 63, 65, 67 and duct 69 is markedly increased by an air-lift pumping effect acting in addition to the pumping effect of the submerged turbine propeller.

The sparge tubes 76, 78 and their respective air delivery lines 71, 73 are removably mounted within respective casing pipes 66, 68 which are sealably attached to discharge duct 60, as shown in FIG. 2, as by welding. Air delivery lines 71, 73 are preferably straight pipes, and sparge tubes 76, 78 may be transversely disposed within discharge duct 60. Mixed liquor rises approximately to level 49, as in the channels 75, 77 of the oxidation ditch 10, within the annular spaces between the casings 66, 68 and the air delivery lines 71, 73. If one of the sparge tubes 76, 78 ever becomes clogged or requires maintenance, a union at the top of its delivery line can be opened so that the assembly can be lifted out of its casing for cleaning the sparge tube.

As a means of conserving power consumption by the air compressors, each discharge duct 29, 60 may be W-shaped by connecting an additional recurved duct to duct 69, followed by a third straight section, another curved section, a fourth straight section at the lowest depth, still another curved section, a fifth straight section, and a final recurved section as the terminus in the discharge channel 77, just above floor 15. Preferably, barrier 22 is widened sufficiently so that top 23 extends above present duct 69 at the center or hump of the "W", and air delivery lines, like lines 71, 73 but much shorter, terminate in sparge tubes like sparge tubes 76, 78 within duct 69, being removably mounted within casings similar to casings 76, 78.

Power is conserved because less pressure is needed to force compressed air to the center hump of the "W". The additional distance under pressure also enables the bacterial population to utilize dissolved oxygen for a longer time while enabling a secondary supply of oxygen to be transferred from the compressed air to the mixed liquor.

In FIG. 1, aerobic zone 86 extends from the turbines 28, 30 to a short distance, such as 50-100 feet, downstream therefrom. This relatively short-length aerobic zone represents overall oxygen-starved process conditions, probably with relatively high F/M values in the range of 0.5-0.7.

Extension 87, around the bend, represents an additional length of aerobic activity in the channel of the oxidation ditch 10. The combined distance of zone 86 + zone 87 indicates a reasonable amount of dissolved oxygen in combination with lower F/M values in the range of 0.2-0.5. The remainder of the channel is at an anoxic level of about 0.1 mg/l or less of dissolved oxygen. This combined distance, divided by the remainder of the distance along the channel, produces a timed aerobic/anoxic ratio that is heavily biased toward denitrifying.

Extension 88, downstream in the opposite side of the ditch 10, represents still additional aerobic activity. The combined distance of zone 86 + zone 87 + zone 88 indicates optimum quantities of dissolved oxygen are being introduced into the flow path for the mixed liquor. This combined distance, divided by the remainder of the distance along the channel to the turbines 28, 30, gives a timed aerobic/anoxic ratio that is generally ideal for combined nitrification and denitrification.

Moreover, when the incoming wastewater feed is added via line 57, just above the floor 15 of the channel in the return bend, organic food sources are maximized for any heterotrophic facultative denitrifying bacteria that are present in the circulating mixed liquor. In addition, any nitrate oxygen that is available in the circulating mixed liquor for carbonaceous BOD reduction is utilized as fully as possible. Most importantly, any nitrate oxygen that is available in the circulating mixed liquor is utilizable for oxidation of any hydrogen sulfide that is present in the feed waste such as an anaerobic lagoon effluent. Such utilization is performed by certain denitrifying bacteria that are present in the anoxic environment of the return bend. These bacteria utilize nitrate oxygen as their oxygen source and hydrogen sulfide as their food or energy source.

By such utilization, hydrogen sulfide in the wastewater feed from the anaerobic lagoon is used to maximize denitrification and to minimize consumption of free dissolved oxygen for chemical and biological oxidation of hydrogen sulfide, thereby enabling free dissolved oxygen to be used to a maximum extent for biological BOD removal and nitrification.

Locating the inlet pipe or an inlet flow diffuser or distribution pipe just above or along the floor 15 of the return bend, where turbulence naturally occurs, enhances opportunities for hydrogen sulfide to mix with the mixed liquor and minimizes its likelihood of escaping to the atmosphere.

By inspection of FIG. 2, the high water level 48 differs from the low water level 49 by height 44, and the low water level 48 is above the impeller 35 by submergence depth 46 which is the minimum under which the turbines 28, 30 can operate without cavitation.

In the oxidation ditch of this invention, the barrier 22, 91 does not function as a dam as might be supposed, but instead is used to control and direct the pumping action and pumping capacity of the submerged turbines 28, 30, 97 so that they create the desired velocity of flow within the channel of the oxidation ditch by enabling pumped mixed liquor to be accumulated in one portion (i.e., the discharge channel 77, 107) of the channel of the pitch and thereby to build up as much head as necessary for pumping the mixed liquor as far and as rapidly as desired.

The barrier 22, 91 also completely prevents back-mixing of aerated mixed liquor, thereby:

(1) increasing the log mean driving force across the intakes and discharges of the submerged turbines 28, 30, 96 and discharge ducts 29, 60, 97, thereby decreasing the energy required for dissolving a given quantity of oxygen in the mixed liquor and increasing the oxygen transfer efficiency and (2) preventing short-circuiting of the mixed liquor with resultant stagnant areas in other parts of the channel. From an energy standpoint, substantially no input power is used for pumping against a static lift. Instead, substantially all input power is used for overcoming dynamic losses caused by: (1) hydraulic friction created by circuit flow past the walls 16, 18 and floor 15 of the channel of the ditch 10; (2) hydraulic turbulence in the channel bends; and (3) hydraulic friction created by the sparge rings 53a, 53b, curved sections 61, 65, 69 and straight sections 53, 67 of the discharge ducts 29, 60.

The mixed liquor is also believed to be pushed or propelled only part of the distance around the channel of the oxidation ditch and is then pulled the remaining distance to the intakes of the submerged turbines 28, 30, 97.

The downdraft submerged turbine aerator offers the following process control advantages for use in the oxidation ditch process for treatment of wastewater: independent control of oxygen supply and mixing; easier control of power consumption to match oxygen demand; no aerosol spray and minimizing of misting; no freezing problems during cold weather operation as typically occurs with rotor aerators, brush aerators, disk aerators, and other surface aerators presently used in oxidation ditches; minimal noise; minimal effect of liquid level variations upon power consumption; and easy compensation for variation of liquid level in the oxidation ditch without the need for floating aerators.

The invention may be more thoroughly understood by study of the following examples, with reference to the drawings.

EXAMPLE I

An oxidation ditch as shown in FIGS. 1–3 was designed and constructed to treat wastewater effluent from an anaerobic lagoon used for pretreatment and flow equalization of raw wastewater produced by a poultry processing plant. This anaerobic effluent was anticipated to have the following characteristics:
Biochemical oxygen demand, BOD(5)=800 mg/l
Total suspended solids, TSS=304
Ammonia nitrogen=40 mg/l
Total Kjeldahl nitrogen, TKN=62 mg/l
pH=6.4
Total phosphorus=6–20 mg/l The average daily flow of anaerobic lagoon effluent was anticipated to be 221,000 gallons per day (0.221 million gallons per day - MGD), 7 days per week, 24 hours per day.

The maximum average BOD(5) loading into the oxidation ditch was calculated as follows (mg/l=#/million #): (0.221 MGD) (8.34 #/gal.) (800 mg/l)=1475 #BOD(5)/day.

The maximum average TKN loading into the oxidation ditch was calculated as follows:

$$(0.221)(8.34)(62 \text{ mg/l}) = 114 \text{#/day}$$

The maximum oxygen demand at process or field conditions for an extended aeration process operated for maximum degree of nitrification was calculated as follows, assuming a design conversion factor of 1.4# oxygen/#BOD(5)+4.5# oxygen/#TKN applied: 1.4(1,475)+4.5(114)=2,578# oxygen/day.

The oxygen required at standard conditions (20° C., one atmosphere, zero dissolved oxygen), assuming a design conversion factor from process to standard of 1.6, was calculated as follows: 1.6×2,578=4,125# oxygen/day;

$$\frac{4,125 \text{# oxygen/day}}{24 \text{ hours/day}} = 172 \text{# oxygen/hour}$$

Assuming that two downdraft submerged turbines would be needed to satisfy this total oxygen requirement, each turbine had to provide 86# oxygen/hour.

The submerged turbine manufacturer recommended selection of two 40-hp turbines, each with a 15 hp blower to supply approximately 213 scfm to an air sparge assembly disposed directly below each turbine impeller.

The volume of the oxidation ditch was calculated so that at high water level, with 6,000 mg/l of mixed liquor suspended solids (MLSS) in its channel, it would be possible to maintain a food-to-microorganism ratio (F/M) of 0.033 (out of a feasible range of 0.01 to 2.0), as follows:

$$\frac{1,475 \text{# } BOD(5)/day}{(8.34)(6,000 \text{# } MLSS/\text{million \#mixed liquor})[.033 \text{# } BOD(5)/\text{\#}MLSS]} = 0.87 \text{ million gallons.}$$

A ditch volume of 900,000 gallons, equalling 120,304 cubic feet, was selected, and the volumetric loading was calculated as follows:

$$\frac{1,475 \text{# } BOD(5)/day}{120.3 \times 10^3 \text{ ft}^3} = 12.25 \text{# } BOD(5)/1,000 \text{ ft}^3$$

The overflow device for the oxidation ditch was then designed so that the ditch operating level could be adjusted to control volume in the ditch between 600,000 gallons and 900,000 gallons.

The channel cross-sectional dimensions were next determined, using the turbine manufacturer's estimate that a 40-hp turbine would pump approximately 46,500 gpm, equalling 103.65 ft³/sec. With two such turbines in operation, the total pumping rate would be 207.3 cubic feet per second.

Using a desired circulation velocity of 1.0 ft/sec with both turbines in operation at high water level, the cross-sectional area for the channel was determined to be 200 square feet: 207.3 cfs/200 ft²=1.04 fps.

The channel was then designed with a trapezoidal cross section as seen in FIG. 3 (although rectangular, square, round, oval, or other shapes could be substituted) to furnish this flow rate.

The channel length in the oxidation ditch was then calculated: 120,304 ft³/200 ft²=601.5 feet.

To compensate for the width of the earthen barrier 22, a distance of 20 feet was added to the ditch, giving 621,5 feet. Then the hydraulic head loss in the channel caused by wall friction was calculated by the Manning Equation for open channel flow (using n=0.03 for a gunnite concrete liner and R=area/wetted perimeter=200/38.19=5.24):

Head loss=$[(\text{Velocity} \times n)/(1.49 \times R^{0.67})]^2$=0.00005 ft/ft of ditch. Head loss=(601.5)(0.00005)=0.029 ft=0.35 inch.

The additional hydraulic head loss caused by flow turbulence around the two bends was also calculated: bend head loss=$2(V^2/2g)$=0.0336 feet.

The total hydraulic head loss is the sum of these losses, equalling 0.75 inch or 0.06 feet.

Each 40-hp turbine provides a flow of 46,500 gpm at a total developed hydraulic head of 2.45 feet. Adding 0.06 feet to this operating head normally has an insignificant effect on the pumping capacity of the submerged turbine, so that revising the ditch cross-sectional area in order to maintain a minimum average velocity of 1.0 fps is not necessary.

This treatment is intended to reduce BOD(5) to less than 20 mg/l, TSS to less than 20 mg/l, ammonia nitrogen to less than 2 mg/l, and pH to 6–9.

EXAMPLE II

An oxidation ditch, similar to but smaller than the ditch of Example I, was designed and constructed to treat waste-water effluent (sewage) from a school. This effluent had the following characteristics:

| | |
|---|---|
| Biochemical oxygen demand, BOD(5) = | 200–250 mg/l |
| Total suspended solids, TSS = | 200–250 mg/l |
| Ammonia nitrogen = | 15–25 mg/l |
| Total Kjeldahl nitrogen (TKN) = | 20–30 mg/l |
| pH = | 7.0 |
| Total phosphorus = | 6–20 mg/l |

The average daily flow was 0.055 MGD, 7 days per week, according to the diurnal flow cycle of normal domestic waste. Following the procedure of Example I, calculations gave the following results, using the higher values of each range: 115# BOD(5)per day; 13.8# TKN; 223#/day of oxygen required at process conditions; 357#/day of oxygen required at standard conditions; 15#/hr of oxygen per turbine (one 10-hp submerged turbine required); 30 scfm of air (one 2-hp blower required); 4,000 mg/l MLSS; 70,000 gallons, equalling 9,357 ft$^3$, at high water level, and 50,000 gallons at low water level; 12.3# BOD(5)/1,000 ft$^3$ as the volumetric loading; 7,500 gpm or 16.7 cfs as the turbine pumping rate; 1.11 fps at the flow rate in the channel; 15 ft$^2$ as the flow area; 624 feet as the ditch length and 10 feet as the barrier width; and 2.50 inches of head loss for the channel+0.46 inch of head loss for the bends, equalling 3.0 inches total head loss which would reduce the turbine pumping capacity to about 7,200 gpm or 16.05 cfs, causing the flow velocity in the channel to be 1.07 fps.

EXAMPLE III

After 71 days of continuous operation with no sludge wastage, the oxidation ditch of Example I was analyzed for dissolved oxygen. At the ends of the ducts 29,60 in discharge channel 75, the dissolved oxygen (D.O.) was 0.6 mg/l; 50 feet downstream from the turbines 28,30, the D.O. was 0.3 mg/l; and in channel on the opposite side of the island, the D.O. was 0.1 mg/1.

There was no filamentous growth, but the effluent from the clarifiers was cloudy because of suspended and colloidal material, representing unconsumed organic food. In general, the oxidation ditch seemed to be deficient in oxygen and microorganisms.

EXAMPLE IV

The oxidation ditch of Example I had been operated with discharge of overflow mixed liquor to the flow dividing unit 83 and thence to one of a pair of hopper clarifiers through lines 85, with no sludge wastage for 80 days. The following data was obtained from composite tests of anaerobic effluent and of clarifier overflow:

| INFLOW | | OUTFLOW |
|---|---|---|
| 250,000 gpd | flow (7 days, 24 hrs/day) | 250,000 gpd |
| 1,045 | BOD(5), mg/l | 83 |
| 220 | TKN | 45 |
| — | NH$_3$—Nitrogen | 43 |

These results correspond to an oxygen demand of at least 7,000 pounds of oxygen per day or at least 292 pounds of oxygen per hour at standard conditions when the operating level in ditch 10 was at 8.5 feet with two turbines in operation and about 227.5 scfm of air being injected under each turbine. These oxygen-transfer results are about 70% greater than those anticipated by the manufacturer of the turbines.

EXAMPLE V

The manufacturer of the submerged turbines used in the oxidation ditch of Example I stated that the recommended air supply rate of 216 scfm (standard cubic feet per minute) was about 80% of the maximum air supply rate that the turbine could handle without flooding, so that the flooding rate would be 270 scfm for either turbine.

The turbine 28 (single-speed) and the turbine 30 (two-speed) were each connected to a separate positive displacement blower capable of delivering 233 scfm at 7.0 psig. However, the blowers could be connected for delivering their combined output to the upper sparge ring (53a in FIG. 2) beneath either turbine.

Because of friction caused by inadequate size of a single sparge ring, it was estimated that 430–460 scfm could be delivered to the flow path of either turbine, about 65% greater than the flood point air supply rate or about 111% greater than the operating air supply rate recommended by the manufacturer of the turbines.

The oxidation ditch of Example I has an operating depth that is variable from 7.5 feet (58 inches of turbine impeller submergence) to 10.5 feet deep (94 inches of turbine impeller submergence). With the depth at 8.5 feet, about 455 scfm from both blowers were injected from the upper sparge ring of turbine 28 (single speed), with turbine 30 (dual speed) operating at top speed but ungassed. It was anticipated that flooding of turbine 28 would occur and that the air valves could then be closed until the turbine could handle the air being injected. However, there was no flooding of turbine 28.

EXAMPLE VI

Dual-speed turbine 30 in the oxidation ditch of Example I was shut off, and the oxidation ditch circulation velocity was allowed to slow down from about 2 fps to about 1 fps which turbine 28 could maintain alone. With all air from both blowers being injected through the upper sparge ring of turbine 28 and with ditch depth still at 8.5 feet, it operated without flooding and continued to do so for 1½ hours when the test was discontinued.

EXAMPLE VII

Both single-speed turbine 28 and dual-speed turbine 30 in the oxidation ditch of Example I were operated (turbine 30 being at top speed) to increase ditch velocity to about 2 fps, with depth at 8.5 feet, and all of the compressed air supply from both blowers (455 scfm) was injected under the impeller of dual-speed turbine 30. It did not flood.

EXAMPLE VIII

Single-speed turbine 28 was shut down. After the ditch velocity had slowed to about 1 fps, all air was again injected under impeller 35 of dual-speed turbine 30, operating at top speed with the operating depth at 8.5 feet. After about seven minutes under these conditions, turbine 30 flooded or stopped pumping.

EXAMPLE IX

With the oxidation ditch of Example I at an operating level of 8.0 feet, all air (455 scfm) was supplied to turbine 28 with turbine 30 at top speed but ungassed. Turbine 28 flooded. The other successful tests at 8.5 feet (i.e., the tests of Examples VI and VII) were attempted, but flooding occurred in each instance.

EXAMPLE X

The level in the oxidation ditch of Example I was raised to about 9.75 feet (64 inches of submergence). All successful tests at 8.5 feet were easily reproduced. Moreover, when all air (455 scfm) was supplied to dual-speed turbine 30 (operating at top speed), with turbine 28 shut down and the ditch velocity at about 1 fps (thus reproducing Example VIII except for the depth), turbine 30 did not flood.

EXAMPLE XI

Each turbine 28, 30 is operated to produce a flow velocity in the channel of the oxidation ditch 10 of Example I of about 2 fps. About 460 scfm of compressed air is sparged below the turbine blades 35 through both sparge rings 53a, 53b of each turbine. Neither floods, and the clarifier outflow is clear, indicating that all organic food is consumed.

Because it will be readily apparent to those skilled in the art that innumerable variations, modifications, applications, and extensions of these embodiments and principles can be made without departing from the spirit and scope of the invention, what is herein defined as such scope and is desired to be protected should be measured, and the invention should be limited, only by the following claims.

What is claimed is:
1. In an activated sludge process for aerobically treating a continuous stream of wastewater by continuously admixing said stream with a quantity of circulating mixed liquor which:
   (a) contains a biomass including heterotrophic aerobic, heterotrophic facultative, and autotrophic microorganisms which exist at least partially as a bacterial floc and for which said wastewater is a food source at a food-to-microorganism ratio by weight varying over a range of 0.01 to 2.5,
   (b) flows translationally within the endless channel, having sides and a bottom, of an oxidation ditch at a circulation velocity that is sufficient to maintain said floc in a state of suspension therewithin without interruption by a clarification zone within said channel so that said admixing occurs once per circuit-flow cycle of said oxidation ditch,
   (c) is diminished by a portion thereof being continuously discharged to a settling means for separating clarified liquor from settled sludge, and
   (d) is increased by at least a part of said settled sludge being continuously returned to said channel,
the improvement comprising the following steps:
   A. dividing said mixed liquor and said channel into upstream liquor within an intake channel and downstream liquor within discharge channel;
   B. pumping all of said upstream liquor downwardly and from said intake channel to said discharge channel;
   C. introducing compressed air to said all of said upstream liquor being pumped in Step B; and
   D. regulating said pumping and independently regulating said introducing of compressed air in order to:
      (1) form a liquor-air mixture of said all of said upstream liquor being pumped and of said compressed air being independently introduced and generate a pressure upon said mixure, for a selected distance, that is greater than the hydraulic pressure at said bottom,
      (2) transfer oxygen from said liquor-air mixture to said all of said upstream liquor to form an aerated mixed liquor as said downstream liquor,
      (3) completely prevent backmixing of said aerated mixed liquor to said intake channel, and
      (4) increase the log mean driving force across the intake and discharge ends of said discharge duct, thereby decreasing the energy required for dissolving a given quantity of oxygen in said mixed liquor and increasing the oxygen transfer efficiency while providing said repetitive aerobic treatment to said all of said mixed liquor within said endless channel and translationally circulating said mixed liquor at said sufficient circulation velocity to maintain said bacterial floc in said state of suspension.

2. The improved activated sludge process of claim 1 wherein said food-to-microorganism ratio varies over the range of 0.01 to 0.2 and said mixed liquor has at least 3,000 mg/l of mixed liquor suspended solids, whereby said oxidation ditch operates as an extended aeration system.

3. The improved activated sludge process of claim 2 wherein said pumping forces said liquor-air mixture to flow downwardly and then toward said discharge channel, whereby a maximum depth is provided for said pumping.

4. The improved activated sludge process of claim 3 wherein said introducing of compressed air occurs at a greater depth than said pumping and creates dispersed air bubbles in said liquor-air mixture.

5. The improved activated sludge process of claim 4 wherein said introducing of compressed air firstly occurs immediately beneath said pumping and secondly occurs downstream thereof at approximately said maximum depth.

6. The improved activated sludge process of claim 5 wherein by varying the proportion of said firstly occuring introducing of said compressed air and said secondly occuring introducing of said compressed air said velocity is varied by at least 50 percent.

7. The improved activated sludge process of claim 6 wherein said oxidation ditch is selectively operable:
   A. to provide aerobic and anoxic zones within said channel for combined nitrification and denitrification of said wastewater; and
   B. to vary the lengths of said aerobic and anoxic zones in accordance with seasonal temperature changes.

8. The improved activated sludge process of claim 7 wherein said pumping is performed independently to create at least two independently flowing streams and wherein said oxidation ditch is selectively operable by varying:
   (a) the flows of said streams singly or in parallel,
   (b) the flow rates of said streams,
   (c) the total amount of said compressed air, and
   (d) the proportion of said compressed air between said first introducing of compressed air and said second introducing of compressed air, whereby:
      (1) said velocity is variable over a range of from 0.5 ft/sec. to at least 3.0 ft/sec. while maintaining a selected dissolved-oxygen content in said stream, or
      (2) said dissolved-oxygen output is variable while maintaining a selected velocity, or
      (3) both said velocity and said dissolved-oxygen output are variable in any desired combination while said flow rates are maintained constant.

9. The improved activated sludge process of claim 8 wherein said continuous stream of wastewater is delivered to said channel within said anoxic zone and upstream of said intake channel in order to enable certain of said microorganisms, that are present in said anoxic zone and use nitrate oxygen as their oxygen source and hydrogen sulfide as their energy source, to maximize denitrification and to minimize consumption of free dissolved oxygen for chemical and biological oxidation of said hydrogen sulfide, thereby enabling said free dissolved oxygen to be used to a maximum extent for biological BOD removal and nitrifications, by utilizing nitrate oxygen that is available in said circulating mixed liquor for oxidation of said hydrogen sulfide that is present in said continuous stream of wastewater.

10. The improved activated sludge process of claim 9 wherein said anoxic zone is at an anoxic level of about 0.1 mg/l or less of dissolved oxygen.

11. The improved activated sludge process of claim 1 wherein said returned part of said settled sludge is mixed with said all of said upstream liquor being pumped from said intake channel in Step B.

12. The improved activated sludge process of claim 1 wherein at least a portion of said liquor-air mixture is at a greater depth than the depth of said discharge channel.

13. The improved activated sludge process of claim 12 wherein said liquor-air mixture is maintained at said greater depth for a sufficient distance that substantially all of said repetitive aerobic treatment occurs under a selected hydraulic pressure that is greater than the pressure corresponding to said depth of said discharge channel.

14. The improved activated sludge process of claim 1 wherein said pumping said bacterial floc creates sufficient shear force that is sheared into smaller particles.

15. An activated sludge process for aerobically treating wastewater being fed into a volume of mixed liquor which is flowing continuously and translationally at a selected velocity through an endless channel of substantially uniform cross-section, without interruption by a pond, said treating comprising the following steps:
   A. dividing said mixed liquor into upstream liquor within an intake channel and downstream liquor within a discharge channel;
   B. continuously pumping all of said upstream liquor downwardly from said intake channel and generating pressures upon said upstream liquor that are greater than the hydraulic pressure at the bottom of said endless channel;
   C. aerating said pumped liquor by introducing an oxygen-containing gas, independently of said pumping, into said all of said upstream liquor during said pumping to form a liquor-gas mixture which is subject to said generated pressures;
   D. discharging said liquor-gas mixture into said discharge channel, whereby said downstream liquor is aerated mixed liquor and said flowing mixed liquor is in plug-type flow; and
   E. preventing backmixing of said aerated mixed liquor to said intake channel;

wherein said velocity of said translationally flowing mixed liquor is controllable and said aerating is independently controllable so that the dissolved-oxygen content of said aerated mixed liquor can also be varied, independently of said velocity, and wherein said endless channel contains an aerobic zone and an anoxic zone therewithin and said variable controllability of said velocity and said independently variable controllability of said aerating provide a means for controlling the lengths of said aerobic and anoxic zones.

16. A wastewater treatment process for operating an oxidation ditch, having an endless channel which contains translationally flowing mixed liquor throughout its length and has a bottom, to provide repetitive aerobic treatment to a continuous incoming stream of wastewater by the activated sludge process, said wastewater treatment process being characterized by the following steps, once each cycle of said mixed liquor flowing translationally through said endless channel:
   A. providing a barrier means, disposed within said channel, for stopping said translationally flowing mixed liquor and for creating upstream liquor within an intake channel and downstream liquor within a discharge channel;
   B. providing a discharge duct which passes beneath said barrier means and comprises an intake end and a discharge end connected to said discharge channel, whereby all of said upstream liquor flows through said discharge duct to said discharge channel;
   C. providing an aeration means, comprising an air sparge means, for introducing compressed air to said all of said upstream liquor passing through said discharge duct;
   D. providing a pump means for pumping all of said upstream liquor through said discharge duct from said intake channel to said discharge channel, said pump means being an axial-flow pump, comprising a downflow impeller and downdraft tube surrounding said impeller and said air sparge means, said downdraft tube being connected to said intake end of said discharge duct and to said intake channel, whereby flow of said intake liquor past said air sparge means produces air bubbles beneath said impeller and forms a liquor-air mixture; and E. operating said pump means and said aeration means in order to:
   (1) continuously force all of said liquor-air mixture through said discharge duct, while generating a pressure upon said mixture that is greater than the hydraulic pressure at said bottom,
   (2) transfer oxygen from said bubbles within said liquor-air mixture to said all of said mixed liquor to from an aerated mixed liquor, having a selected content of dissolved oxygen, as said downstream liquor, said selected content diminishing, while said aerated mixed liquor is flowing translationally through said endless channel, within an aerobic zone defined by a dissolved oxygen content grater than 0.1 mg/l, and
   (3) vary selectively said content of dissolved oxygen within said aerated mixed liquor at a substantially constant selected flow rate of said translationally flowing mixed liquor, whereby the length of said aerobic zone is selectively controlled.

* * * * *